UNITED STATES PATENT OFFICE.

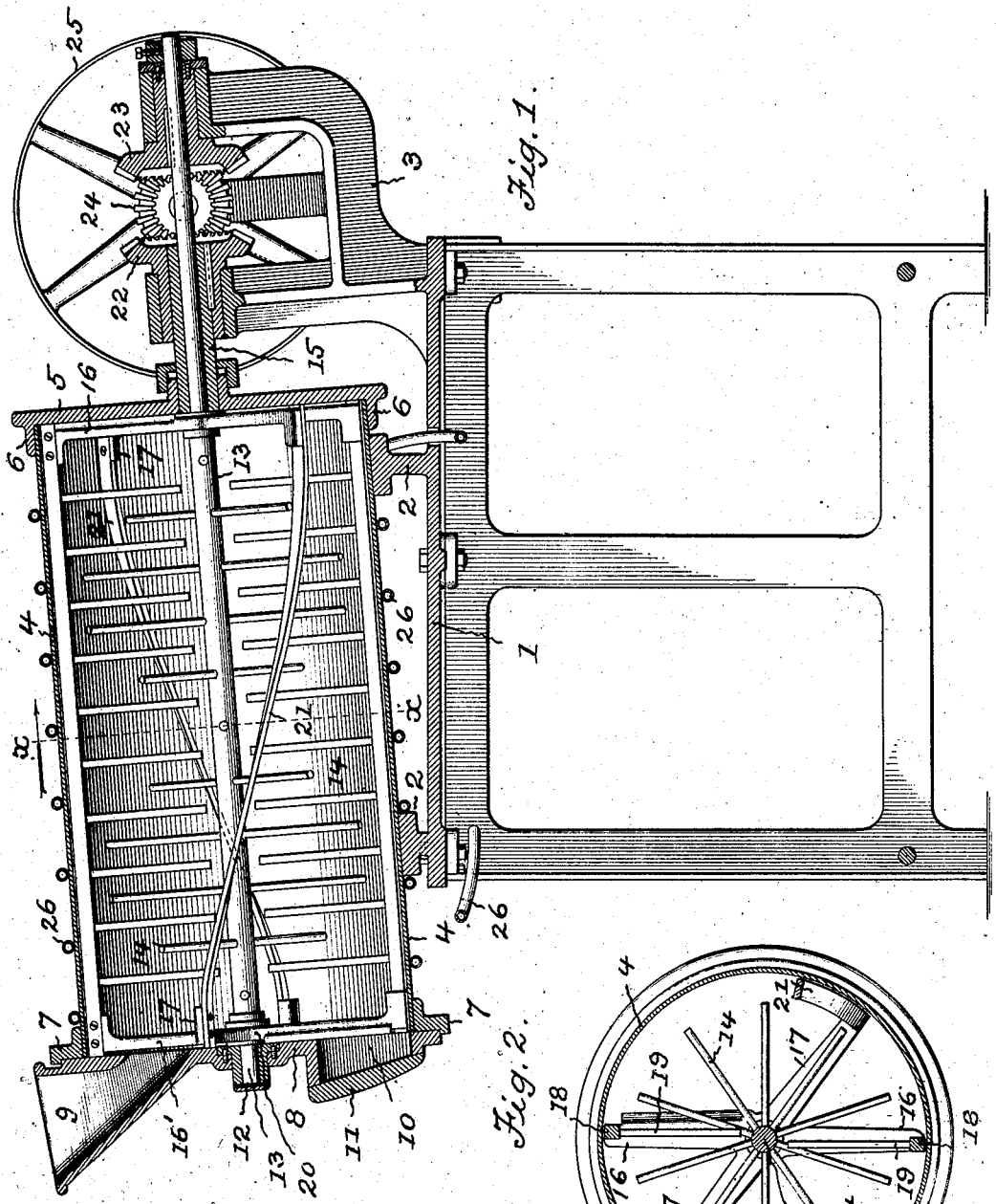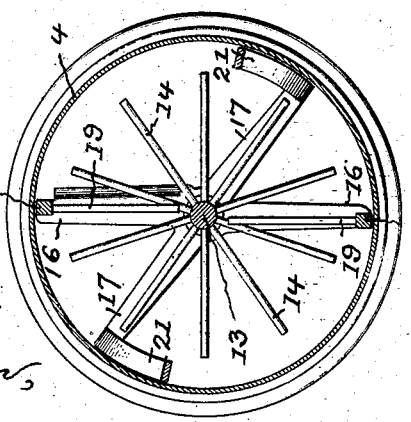

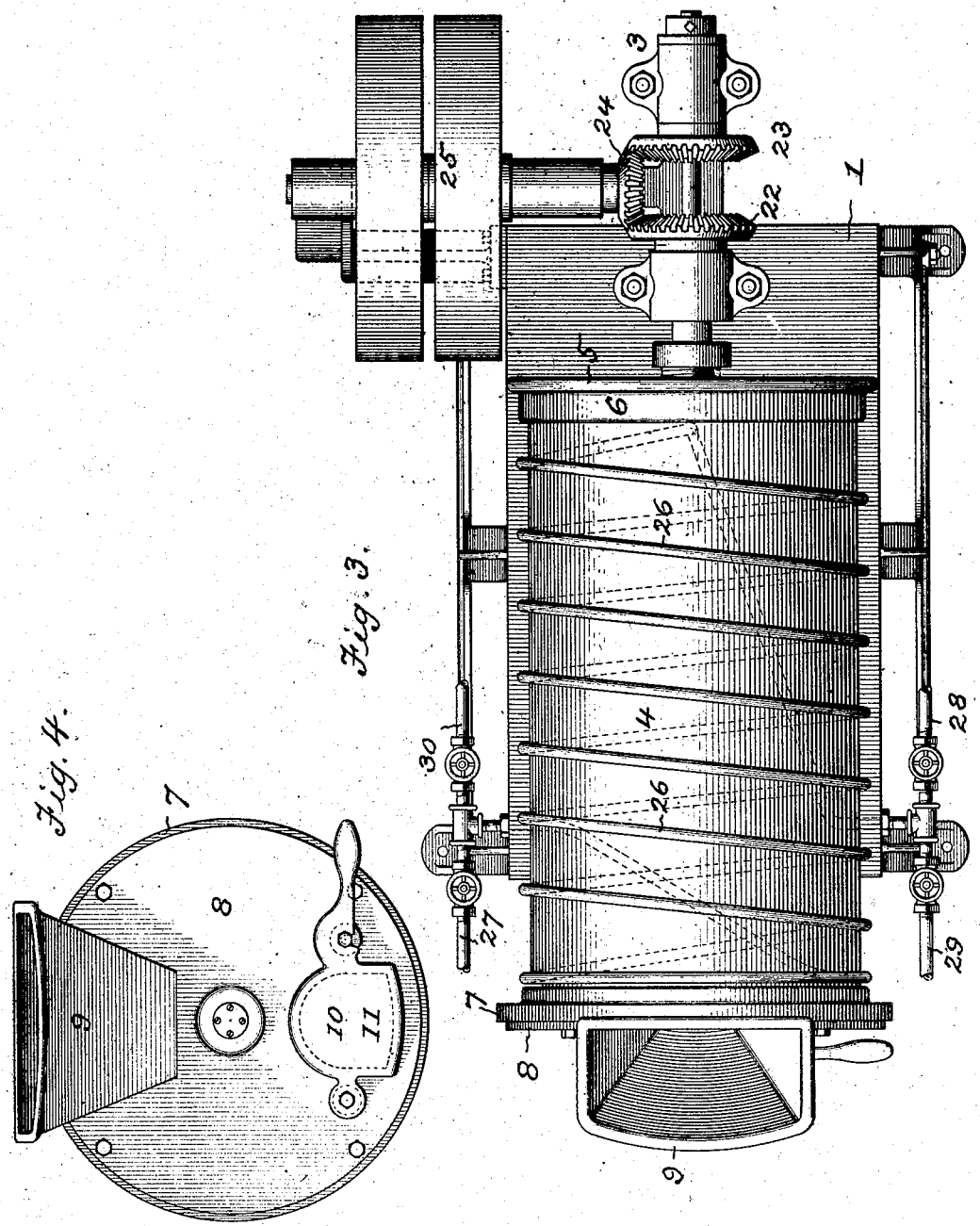

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

MIXING APPARATUS.

937,025.  Specification of Letters Patent.  Patented Oct. 12, 1909.

Application filed October 19, 1908. Serial No. 458,348.

*To all whom it may concern:*

Be it known that I, GEORGE F. DICKSON, a citizen of the United States of America, and a resident of Chicago, in the county of Cook and State of Illinois, have invented certain new and useful Improvements in Mixing Apparatus, of which the following is a specification.

This invention relates to an apparatus for mixing and stirring marshmallows and like confections, and has for its object to provide a simple and efficient structural arrangement and combination of parts whereby a very effective and thorough mixing and stirring of the material is effected; a rapid and convenient discharge of the material attained with a completion of the mixing and stirring operation, and the temperature of the material maintained at any desired degree during such mixing and stirring operation, all as will hereinafter more fully appear.

In the accompanying drawings: Figure 1, is a longitudinal central sectional elevation of the apparatus. Fig. 2, is a detail transverse section on line x—x, Fig. 1. Fig. 3, is a top plan. Fig. 4, is a detail front end elevation.

Similar numerals of reference indicate like parts in the several views.

Referring to the drawings, 1 represents the supporting base plate or bed of the apparatus provided with a pair of vertical saddle extensions 2 for the support of the cylindrical mixing chamber hereinafter described. Such extensions 2 are preferably of different heights in order to support the mixing chamber and its accessories in a position slightly inclined from a horizontal plane for purposes hereinafter stated.

3, is a vertical forked standard carried at the rear end of the bed plate 1, and affording journal bearings for the carrying shafts of the hereinafter described mixing mechanism by which the effective and thorough mixing of the material is attained within the mixing chamber.

4 is a cylindrical shell forming the circular inclosing wall of the mixing chamber, and rigidly secured to the saddle extensions 2, aforesaid.

5 is the rear end head closing the rear end of the shell 4, and to such end said head is formed with an annular flange 6 inside of which the rear end of said shell fits to afford a substantial connection. Such head is also provided with a central hub through which pass the carrying shafts of the mixing mechanism hereinafter described.

7 is an annular ring secured to the forward end of the shell 4, and provided with a recess in its forward face in which fits the front end head 8 of the mixing chamber, and said forward head is held in place in a removable manner by attaching bolts or other suitable fastenings.

9 is an upwardly extending neck or hopper formed on the upper part of the front end head 8, and adapted to receive the material to be operated on and conduct the same into the mixing chamber.

10 is the outlet orifice for the mixed material. Such orifice is formed in the lower part of the front end head 8, and is normally closed by a pivoted gate 11, as illustrated in Fig. 4.

12 is a centrally arranged recess in the front end head 8 to afford a bearing for the forward end of the carrying shaft of the mixing fingers hereinafter described.

13 is a centrally arranged shaft extending longitudinally through the mixing chamber with its forward end journaled in the before described recess 12, while its rear end extends beyond the mixing chamber and has bearing in a journal box carried by one of the forks of the vertical standard 3 before described.

14 are a series of radial mixing fingers carried by the shaft 13, and having a spiral arrangement as shown.

15 is a tubular shaft surrounding the aforesaid shaft 13 and having bearing near its forward end in the central hub of the rear end head 5 of the mixing chamber, and at its rear end in a journal box carried by the other fork of the standard 2 aforesaid.

16 and 17 are radial arms carried by the tubular shaft 15 at the rear end of the interior of the mixing chamber to form the rear end supports for the mixing combs and spiral conveying blades hereinafter described.

18 are longitudinal bars moving in adjacent relation to the inner circular surface of the mixing chamber, and extending the length of the same to constitute the back of the mixing comb and from which extend inwardly the radial prongs 19 of the comb, as shown in Figs. 1 and 2. The bars 18 are supported at their rear ends by the radial arms 16 aforesaid, and at their forward ends by counterpart arms 16' carried by a hub 20 journaled on the shaft 13.

21, are a pair of conveyer blades moving in adjacent relation to the inner circular surface of the mixing chamber and extending the length of the same in a plane oblique to the longitudinal axis of the apparatus and in a direction opposite to that of the mixing fingers 14, before described. Such conveyer blades are attached at their rear ends to the radial arms 17 before described, and at their forward ends to counterpart arms, 17' carried by the hub 20 aforesaid. The function of such conveyer blades is to impart to that portion of the material adjacent to the circular wall of the mixing chamber a longitudinal movement in a direction toward the forward end of said chamber, while the inner portion of such material is moved in an opposite direction by the spirally arranged mixing fingers 14 aforesaid, to cause an endless circulation of the material during the operation of the apparatus. Another function of the conveyer blades 21 is to cause a positive discharge of the material on the completion of the mixing operation and an opening of the outlet gate 11 aforesaid.

22 is a bevel gear carried by the tubular shaft 15; and 23 is a companion bevel gear carried by the central shaft 13.

24 is an intermediate driving bevel gear meshing with and driving the gears 22 and 23 in reversed directions. Said gear 24 is carried by a transversely arranged shaft upon which are also mounted the pulleys 25, by which the apparatus is driven.

With the apparatus of the described construction, the arrangement of the mixing chamber in a position slightly inclined from a horizontal plane, is of material value in effecting a proper and thorough mixture of marshmallow and like confections, and the subsequent rapid discharge of the mixed material from the mixing chamber.

26 is a coil of pipe encircling the periphery of the shell 4 of the mixing chamber, with its respective ends having counterpart valved inlet and outlet pipes 27, 28 and 29, 30, through which either cold water or steam can be caused to circulate through the coil 26, to maintain the mixing chamber at the temperature best adapted to a perfect and thorough mixture or beating of the marshmallow or like confection.

With the above described construction, when a circulation of water is desired, the valve in the water inlet pipe 27 and the valve in the water outlet pipe 28 are opened, while the valves in the steam inlet and steam outlet pipes 29 and 30 are closed. When a circulation of steam is desired, the valve in the steam inlet pipe 29 and the valve in the steam outlet pipe 30 are opened, and the valves in the water inlet and water outlet pipes 27 and 28 are closed.

Having thus fully described my said invention what I claim as new and desire to secure by Letters Patent, is:—

1. In a mixing apparatus for confections, the combination of a closed circular casing constituting a mixing chamber and supported in a substantially horizontal position, inlet and outlet openings at one end of said casing, a mixing mechanism within said chamber, the same comprising a longitudinal shaft carrying a series of spirally arranged mixing fingers, a tubular shaft surrounding said longitudinal shaft, a pair of mixing combs and conveyer blades operatively connected to said tubular shaft and gearing connections for imparting reversed rotation to said shafts, and means surrounding said casing for maintaining a predetermined temperature in said casing, substantially as set forth.

2. In a mixing apparatus for confections, the combination of a closed cylindrical casing constituting a mixing chamber and supported in a position inclined from a horizontal plane, inlet and outlet openings at one end of said casing, a mixing mechanism within said casing; the same comprising a longitudinal shaft carrying a series of spirally arranged mixing fingers, a tubular shaft surrounding said longitudinal shaft, a pair of mixing combs and conveyer blades operatively connected to said tubular shaft and gearing connections for imparting reversed rotation to said shafts, and means surrounding said casing for maintaining a predetermined temperature in said casing, substantially as set forth.

3. In a mixing apparatus for confections, the combination of a closed circular casing constituting a mixing chamber and supported in a substantially horizontal position, inlet and outlet openings at one end of said casing, a mixing mechanism within said chamber, the same comprising a longitudinal shaft carrying a series of spirally arranged mixing fingers, a tubular shaft surrounding said longitudinal shaft, a pair of mixing combs and conveyer blades operatively connected to said tubular shaft and gearing connections for imparting reversed rotation to said shafts, and means surrounding said casing for maintaining a predetermined temperature in said casing, the same comprising a coil of pipe encircling the casing and having valved inlet and outlet pipes for the introduction of steam or water, substantially as set forth.

4. In a mixing apparatus for confections, the combination of a closed cylindrical casing constituting a mixing chamber and supported in a position inclined from a horizontal plane, inlet and outlet openings at one end of said casing, a mixing mechanism within said casing, the same comprising a longitudinal shaft carrying a series of spirally arranged mixing fingers, a tubular shaft surrounding said longitudinal shaft, a pair of mixing combs and conveyer blades operatively connected to said tubular shaft and gearing connections for imparting reversed rotation to said shafts, and means surrounding said casing for maintaining a predetermined temperature in said casing, the same comprising a coil of pipe encircling the casing and having valved inlet and outlet pipes for the introduction of steam or water, substantially as set forth.

Signed at Chicago, Illinois, this 15th day of October 1908.

GEORGE F. DICKSON.

Witnesses:
 ROBERT BURNS,
 HENRY MOE.